United States Patent
Yamakawa

(10) Patent No.: US 9,258,447 B2
(45) Date of Patent: Feb. 9, 2016

(54) IMAGING FORMING APPARATUS, CONTROL METHOD OF IMAGE FORMING APPARATUS, AND RECORDING MEDIUM

(71) Applicant: CANON KABUSHIKI KAISHA, Tokyo (JP)

(72) Inventor: Junichi Yamakawa, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 14/476,451

(22) Filed: Sep. 3, 2014

(65) Prior Publication Data

US 2015/0062611 A1    Mar. 5, 2015

(30) Foreign Application Priority Data

Sep. 5, 2013   (JP) ................................. 2013-184255

(51) Int. Cl.
    *G06F 3/12*      (2006.01)
    *H04N 1/00*      (2006.01)
    *G06K 15/00*     (2006.01)
    *G06F 1/00*      (2006.01)

(52) U.S. Cl.
    CPC ........ *H04N 1/00896* (2013.01); *G06K 15/4055* (2013.01); *H04N 2201/0094* (2013.01)

(58) Field of Classification Search
    None
    See application file for complete search history.

(56) References Cited

U.S. PATENT DOCUMENTS

| 7,864,348 B2* | 1/2011 | Suzuki ......................... 358/1.13 |
| 2009/0259868 A1* | 10/2009 | Katoh ........................... 713/324 |
| 2010/0262691 A1* | 10/2010 | Shouno ................... H04L 69/28 709/224 |
| 2012/0224206 A1* | 9/2012 | Takahashi et al. ........... 358/1.13 |
| 2012/0246502 A1* | 9/2012 | Koga ................ H04N 1/00896 713/323 |

FOREIGN PATENT DOCUMENTS

| JP | 2010-2500 A | 1/2010 |
| JP | 2010002500 A * | 1/2010 |

* cited by examiner

*Primary Examiner* — Marivelisse Santiago Cordero
*Assistant Examiner* — Niel R McLean
(74) *Attorney, Agent, or Firm* — Canon U.S.A., Inc. IP Division

(57) ABSTRACT

An image forming apparatus capable of receiving a raster image from an image processing controller includes: a transmitting unit transmitting device information of the image forming apparatus to an external device via the image processing controller; a determining unit determining whether the image processing controller is in a first power condition or in a second power condition consuming lower power than the first power condition; and a control unit allowing the transmitting unit to transmit the device information to the external device in a case where the determining unit determines that the image processing controller is in the first power condition, and in a case where the determining unit determines that the image processing controller is in the second power condition, restrict the transmitting unit to transmit the device information to the external device until the image processing controller returns to the first power condition from the second power condition.

9 Claims, 12 Drawing Sheets

IMAGING FORMING APPARATUS, CONTROL METHOD OF IMAGE FORMING APPARATUS, AND RECORDING MEDIUM

BACKGROUND

1. Field

The present invention relates to control of an image forming system which processes images by collaborative operation of an image processing device and an image processing controller.

2. Description of Related Art

Recently, the demand for realizing power saving of devices, including an image forming apparatus, is increasing. For meeting this demand, there has been proposed a technology which shifts the power condition of an image forming apparatus to a power saving condition when the image forming apparatus is not operated for a certain period or in other situations (see Japanese Patent Application Laid-Open No. 2010-2500). According to this image forming apparatus, the power condition of the image forming apparatus shifts to the power saving condition after an elapse of a certain period from the end of a printing process performed by a printer unit and a scanner process performed by a scanner unit, or after an elapse of a certain period from the end of communication with an external device.

There is a type of this image forming apparatus which connects with an image processing controller capable of performing image processing in cooperation with the image forming apparatus. This image processing controller also shifts to the power saving condition when no printing data is processed for a certain period, or when no other information processing device on a network accesses the image processing controller.

However, the following problems arise from this conventional system. The image forming apparatus connects with a network with the image processing controller interposed between the image forming apparatus and the network. According to this structure, transmission of information from the image forming apparatus to the outside under the power saving condition of the image processing controller is allowed only after the image processing controller is restored from the power saving condition. In this case, the image processing controller needs to be restored from the power saving condition for every transmission to the outside even when immediate transmission is not required. Therefore, improvement is still needed for this type of image forming apparatus in view of power saving and durability of devices.

SUMMARY

It is an object of the invention to provide a mechanism capable of achieving energy saving by reducing the number of times of restoration of an image processing controller from a power saving condition, which controller functions as a data relay from an image forming apparatus.

An image forming apparatus, capable of receiving a raster image from an image processing controller which generates the raster image, includes: a transmitting unit configured to transmit device information of the image forming apparatus to an external device via the image processing controller; a determining unit configured to determine whether the image processing controller is in a first power condition or in a second power condition which consumes lower power than the first power condition; and a control unit configured to allow the transmitting unit to transmit the device information to the external device in a case where the determining unit determines that the image processing controller is in the first power condition, and configured to restrict the transmitting unit to transmit the device information to the external device until the image processing controller returns to the first power condition from the second power condition in a case where the determining unit determines that the image processing controller is in the second power condition.

Further features will become apparent from the following description of exemplary embodiments (with reference to the attached drawings).

DETAILED DESCRIPTION

Exemplary embodiments are hereinafter described in detail with reference to the drawings.

<General Structure of Image Forming System>

Figure 1:
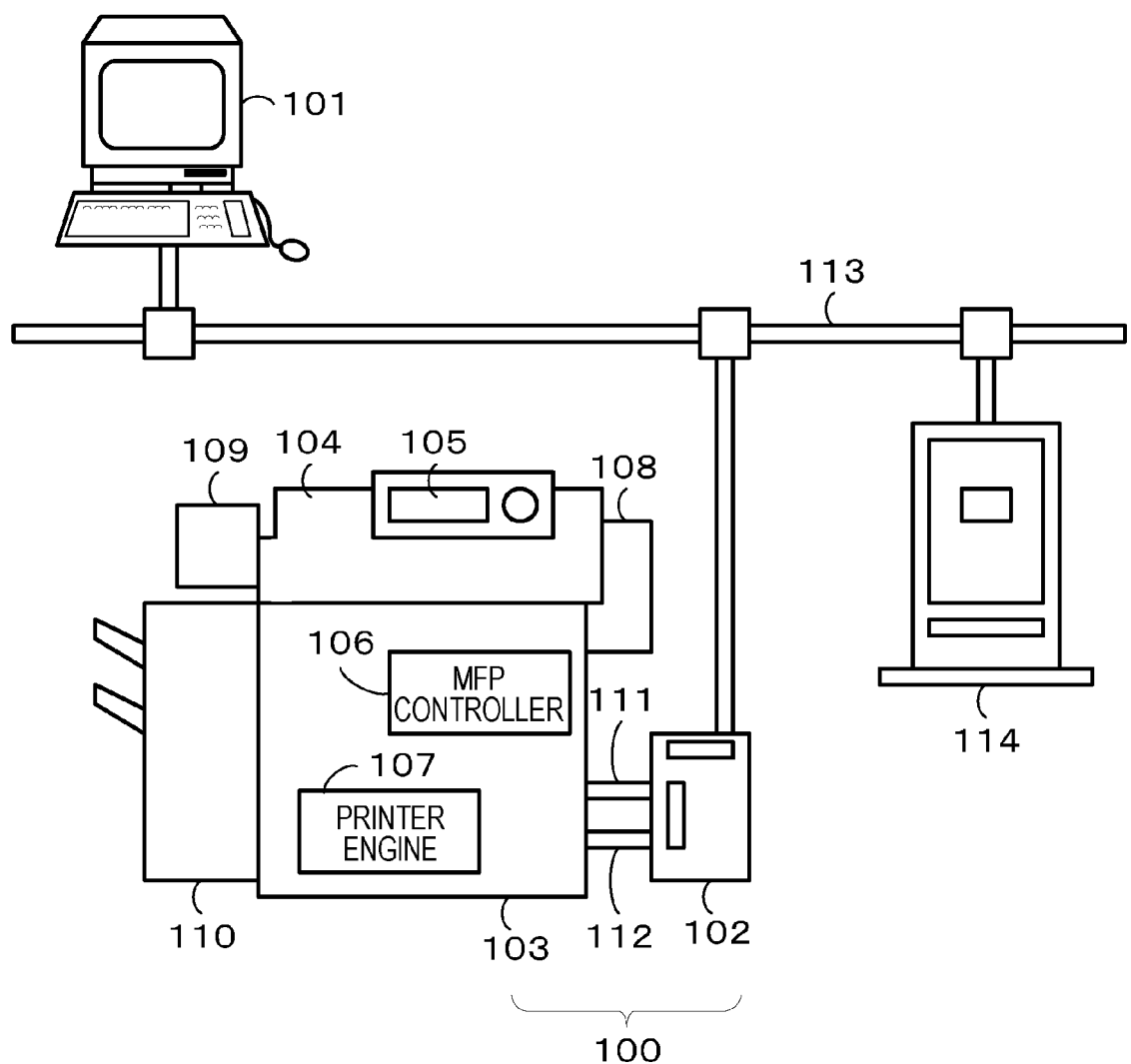
FIG. 1 illustrates an example of the general structure of an image forming system according to an embodiment.

FIG. 1 illustrates an example of the general structure of an image forming system according to an embodiment of the invention. FIG. 1 illustrates an image forming system (image processing system) 100. The image forming system 100 includes an image forming apparatus (first image processing apparatus) 103, and an image processing controller (second image processing apparatus) 102.

The image forming system 100 connects with a client computer 101 in such a condition as to be communicative with the client computer 101. The client computer 101 and the image processing controller 102 connect with each other via a LAN 113 in such a condition as to be communicative with each other. The image processing controller 102 and the image forming apparatus 103 connect with each other via a control cable 111 and an image video cable 112.

According to this embodiment, the image forming apparatus 103 does not directly connect with the LAN 113. In other words, the image forming apparatus 103 and the client computer 101 communicate with each other with the image processing controller 102 interposed between the image forming apparatus 103 and the client computer 101. However, the image forming apparatus 103 may connect with the LAN 113. In other words, the image forming apparatus 103 may directly connect with the client computer 101 in such a condition as to be communicative with the client computer 101.

The client computer 101 starts an application and issues printing instructions and others to the image forming apparatus 103. The image processing controller 102 performs image processing in cooperation with the image forming apparatus 103. The image forming apparatus 103 is an MFP (Multiple Function Peripheral). The image forming apparatus 103 includes a scanner unit 104, an operation unit 105, an MFP controller 106, a printer unit (printer engine) 107, a facsimile unit 108, an IC card reader 109, and a finisher 110. A server 114 is a server which collects and manages device condition information about the image forming apparatus 103.

<Structure of Image Forming System>

Figure 2:
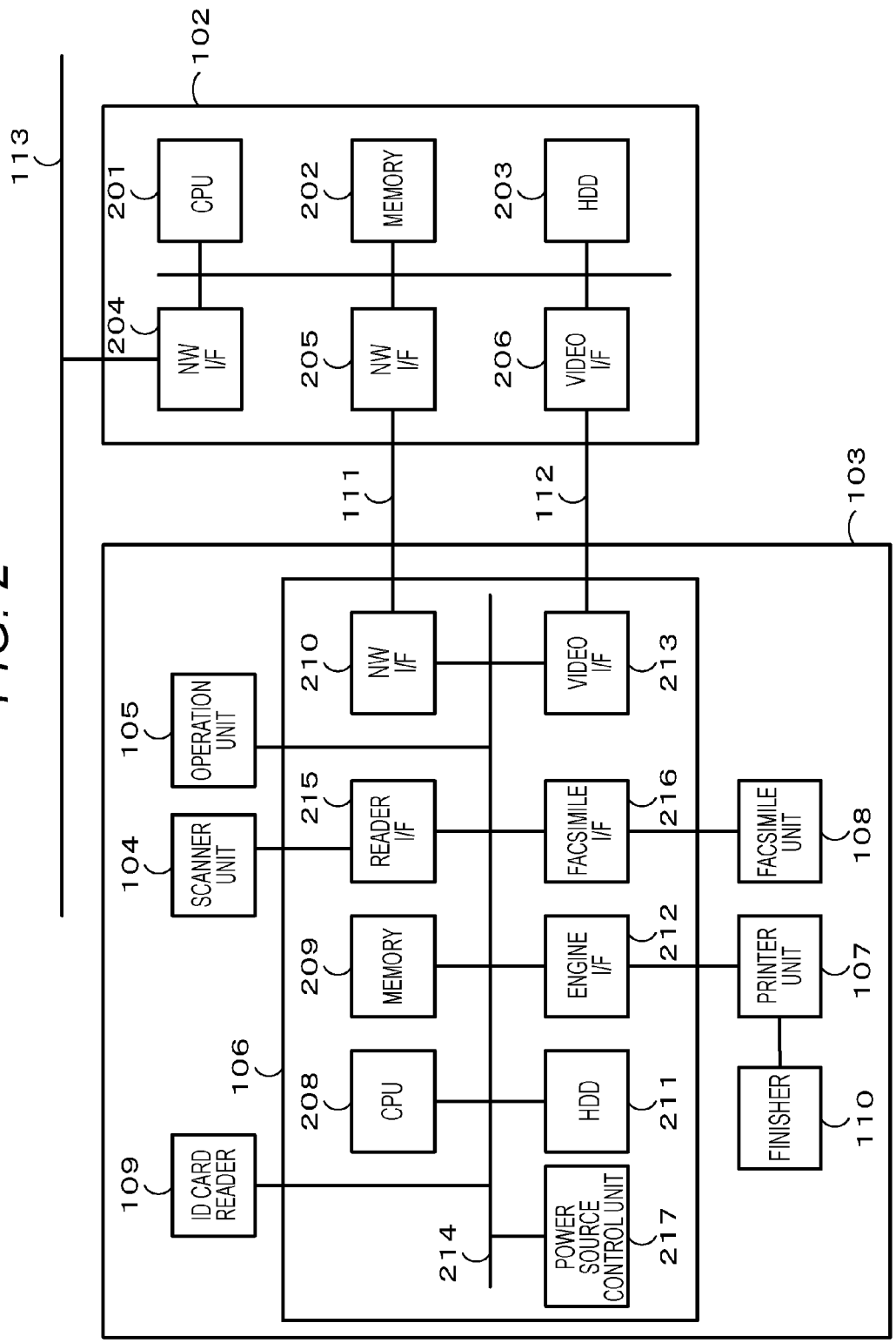
FIG. 2 illustrates an example of the hardware structures of an image forming apparatus and an image processing controller.

FIG. 2 is a block diagram illustrating an example of the hardware structures of the image forming apparatus 103 and the image processing controller 102.

The scanner unit 104 of the image forming apparatus 103 reads a manuscript and inputs image data. The operation unit 105 has various types of keys and a panel. The operation unit 105 receives various types of instructions from a user by way of the various keys. The operation unit 105 displays various types of information on the panel. The MFP controller 106 controls the foregoing scanner unit 104, printer unit 107 and other components. The MFP controller 106 will be detailed later.

The printer unit 107 performs printing on a sheet based on image data. The facsimile unit 108 connects with a not-illustrated telephone line, and performs input/output processing of facsimile via the telephone line or others. The IC card reader 109 reads information from an IC card indicating identification of a user. The finisher 110 receives the sheet containing an image formed by the printer unit 107, and performs various processes such as sheet discharging, sorting, stapling, punching, and cutting for the received sheet.

The image forming apparatus 103 thus constructed performs the following functions.

[COPY Function]

A COPY function records image data of a manuscript read by the scanner unit 104 on an HDD 211 contained in the MFP controller 106, and allows the printer unit 107 to perform printing of recorded image data on a sheet.

[SEND Function]

A SEND function transmits image data of a manuscript read by the scanner unit 104 to the client computer 101 via a network.

[BOX Function]

A BOX function records image data of a manuscript read by the scanner unit 104 on the HDD 211 contained in the MFP controller 106. Moreover, the BOX function stores image data transmitted from the client computer 101 in the HDD 211 contained in the MFP controller 106.

[PRINT Function]

A PRINT function allows the printer unit 107 to interpret PDL (page description language) data transmitted from the client computer 101, and print the data.

<Details of MFP Controller of Image Processing Apparatus>

The MFP controller 106 of the image forming apparatus 103 is now detailed with reference to FIG. 2.

The MFP controller 106 includes a CPU 208, a memory 209, a network I/F 210, the HDD 211, an engine I/F 212, a video I/F 213, a reader I/F 215, a facsimile I/F 216, and a power source control unit 217.

The CPU 208 implements programs stored in a memory unit (memory 209 and HDD 211) to control the respective parts of the image forming apparatus 103 via a system bus 214 and perform calculations. The memory 209 functions as a work memory of the CPU 208. The network I/F 210 transmits and receives control commands to and from the image processing controller 102 via the control cable 111.

The HDD 211 is a large-capacity memory unit, and stores various types of control programs performed by the CPU 208 and image data. A memory unit other than the HDD, such as SSD (Solid State Drive), may be equipped.

The engine I/F 212 transmits and receives control commands to and from the printer unit 107. The video I/F 213 transmits and receives image data to and from the image processing controller 102 via the image video cable 112. The reader I/F 215 transmits and receives control commands to and from the scanner unit 104 and the operation unit 105. The facsimile I/F 216 connects with the facsimile unit 108. The power source control unit 217 controls power supply to the respective parts of the image forming apparatus 103.

<Details of Image Processing Controller>

As illustrated in FIG. 2, the image processing controller 102 includes a CPU 201, a memory 202, an HDD 203, network I/Fs 204 and 205, and a video I/F 206.

The CPU 201 implements programs stored in the memory unit (memory 202 and HDD 203) to control the respective parts of the image processing controller 102 via a system bus 207 and perform calculations. The memory 202 functions as a work memory of the CPU 201.

The HDD 203 is a large-capacity memory unit, and stores various types of control programs implemented by the CPU 201, and image data. A memory unit other than the HDD, such as SSD (Solid State Drive), may be equipped.

The network I/F 204 communicates with other devices including the client computer 101 via the LAN 113. The network I/F 205 transmits and receives control commands to and from the image forming apparatus 103 via the control cable 111. The video I/F 206 transmits and receives image data to and from the image forming apparatus 103 via the image video cable 112.

<Power Source Circuit Diagram of Image Forming Apparatus>

The power source structure of the image forming apparatus 103 is now described with reference to FIG. 3.

Figure 3:
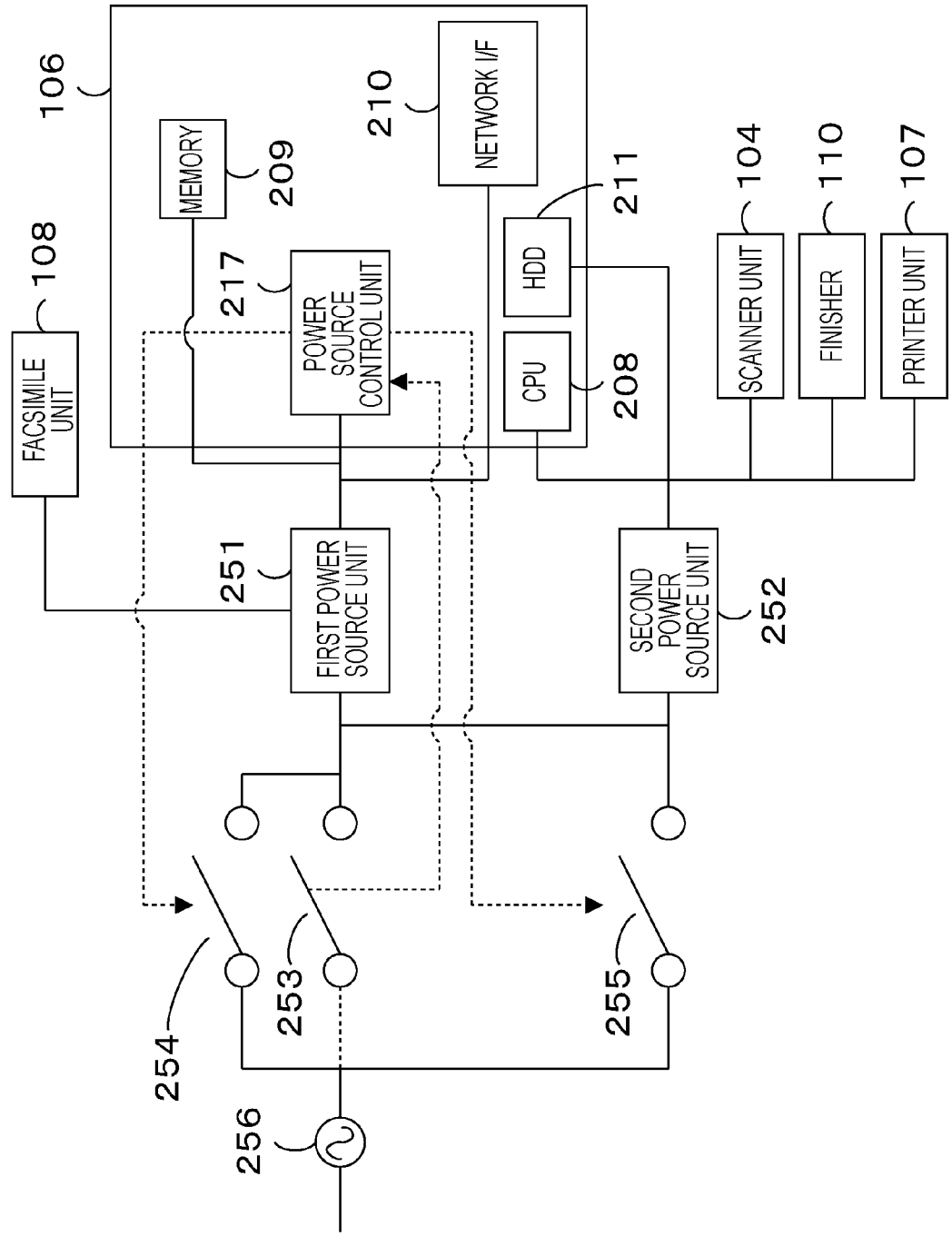
FIG. 3 illustrates an example of a power source circuit of the image forming apparatus.

FIG. 3 illustrates an example of a power source circuit of the image forming apparatus 103.

The image forming apparatus 103 includes a small-capacity first power source unit 251, and a large-capacity second power source unit 252. The first power source unit 251 converts alternate current power source supplied from an AC power source 256 into direct current power source (3.3 V, for example). This direct current power source is supplied to the facsimile unit 108, the power source control unit 217, the memory 209, the network I/F 210, and others.

The second power source unit 252 converts the alternate current power source supplied from the AC power source 256 into direct current power source (12 V or 24 V, for example). This direct current power source is supplied to the printer unit 107, the scanner unit 104, the finisher 110, the CPU 208, the HDD 211, and others.

A rocker switch 253 and a relay 254 are provided between the AC power source 256 and the first power source unit 251. A relay 255 is provided between the AC power source 256 and the second power source unit 252. The rocker switch 253 is turned on or turned off in accordance with operation of a user. The condition of the rocker switch 253 (OFF condition or ON condition) is notified to the power source control unit 217 described below.

The power source control unit 217 detects the condition of the rocker switch 253 (ON condition or OFF condition). In addition, the power source control unit 217 switches on-off of the relay 254 and the relay 255.

The power source control unit 217 turns on both the relay 254 and the relay 255. As a result, power is supplied from the first power source unit 251 and the second power source unit 252 to the respective units such as the printer unit 107, the scanner unit 104, and the finisher 110. Accordingly, the image forming apparatus 103 comes into a standby condition.

On the other hand, the power source control unit 217 turns on the relay 254 and turns off the relay 255. As a result, power supply from the second power source unit 252 to the printer unit 107, the scanner unit 104 and others stops. Accordingly, the image forming apparatus 103 comes into a power saving condition 604. In the power saving condition 604, power is supplied only to the limited parts such as the power source control unit 217, the memory 209, and the network I/F 210, and is not supplied to the other parts.

<Block Diagram of Network I/F>

Figure 4:
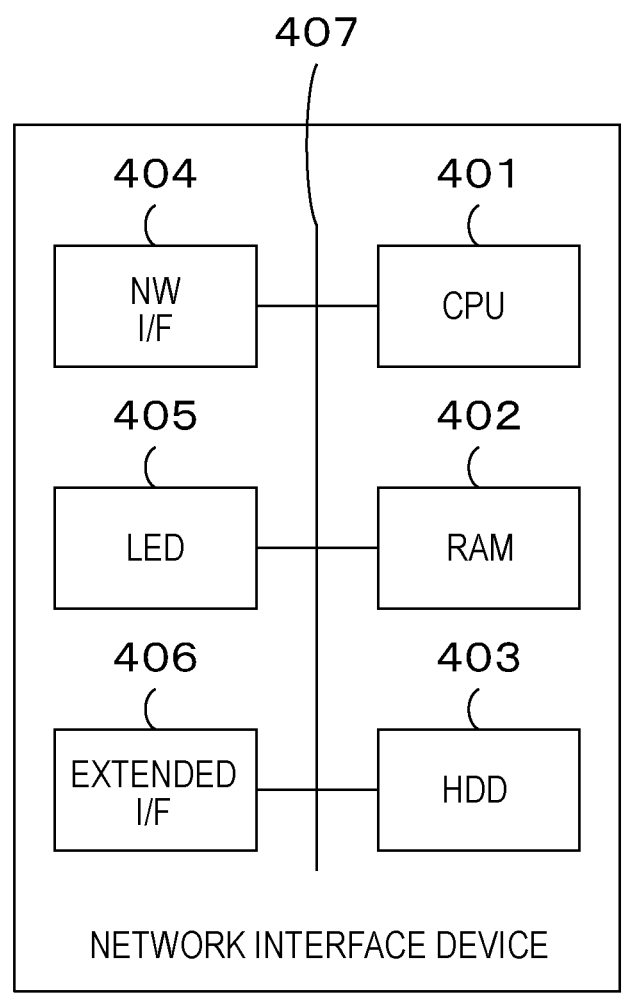
FIG. 4 illustrates an example of the hardware structure of a network I/F.

FIG. 4 is a block diagram illustrating an example of the hardware structure of the network I/Fs 204, 205, and 210. The network I/Fs 204, 205, and 210 are network interface devices detachably attached to the image processing controller 102 and the image forming apparatus 103.

As illustrated in FIG. 4, each of the network I/Fs 204, 205, and 210 includes a CPU 401, a RAM 402, a ROM 403, a network I/F 404, an LED 405, an extended I/F 406, and a system bus 407 connecting these components. The CPU 401 performs various types of controls under a control program stored in the ROM 403.

In case of the network I/F 204, the CPU 401 connects with the LAN 113 via the network I/F 404, and further communicates with the client computer 101 located on the LAN 113 by way of the LAN 113 in accordance with a predetermined communication protocol, for example. This structure allows the CPU 401 to receive various types of data including printing data and printing control commands transmitted from the client computer 101 and transfer the data to the image processing controller 102 via the extended I/F 406, and thereby allows the image processing controller 102 to perform image processing, for example.

The RAM 402 functions as a temporary memory area such as a main memory and a work area of the CPU 401. The LED 405 functions as an indication unit indicating the operation condition of the network I/F 204, 205, or 210. The LED 405 indicates the electric connection condition between the network I/F 404 and the LAN 113, and various operation conditions such as communication modes using colors and blinking patterns of an LED.

The extended I/F 406 is an I/F for connection between the network I/F 204, 205, or 210 and the image processing controller 102 or the image forming apparatus 103. The extended I/F 406 connects with a PCI (Peripheral Component Interconnect) bus or the like.

<Software Structure of Image Processing Controller>

The software structure of the image processing controller 102 is now described with reference to FIG. 5.

Figure 5:
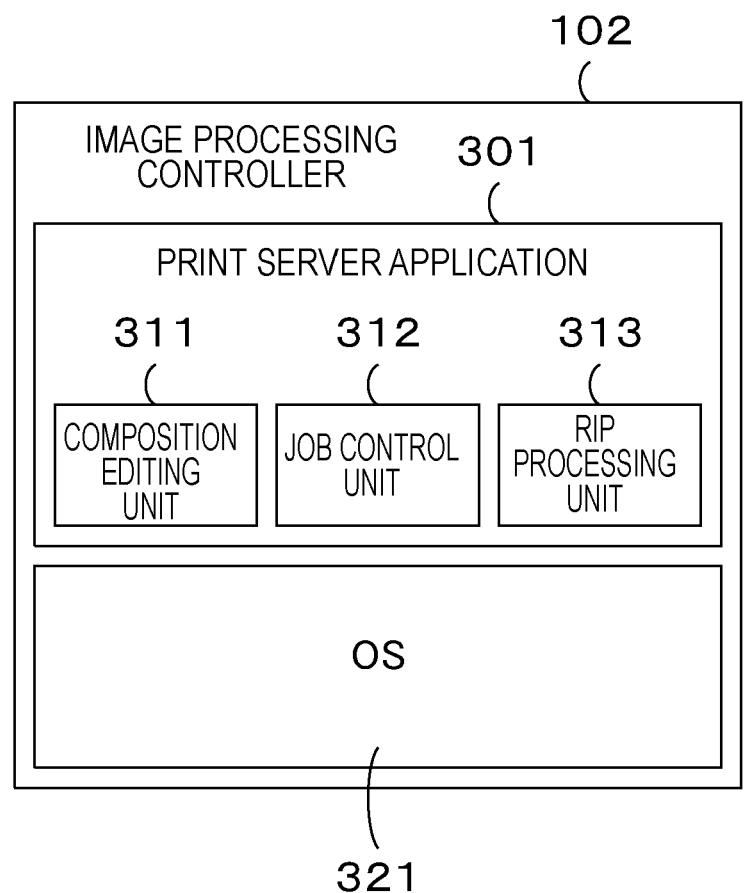
FIG. 5 illustrates an example of the software structure of the image processing controller.

FIG. 5 is a block diagram illustrating an example of the software structure of the image processing controller 102. The respective functions of the software illustrated in FIG. 5 are performed under programs stored in the memory 202 or the HDD 203 of the image processing controller 102 and read and implemented by the CPU 201.

An OS 321 is an OS (operating system) corresponding to an operating system of the image processing controller 102. A print server application 301 is application software operated on the OS 321 and implemented by the CPU 201. The print server application 301 includes a composition editing unit 311, a Job control unit 312, and an RIP processing unit 313, and performs various processing including image processing.

The composition editing unit 311 is an editing unit which performs a composition editing process for editing image data on each page into a bookbinding composition format in accordance with instructions from the client computer 101. The Job control unit 312 is a control unit which controls printing Job in accordance with instructions from the client computer 101. More specifically, the Job control unit 312 receives printing data from the client computer 101, issues instructions associated with the printing data, and controls the printing order of the printing Job. The RIP processing unit 313 is a processing unit which converts PDL (Page Description Language) into a printable raster image at the time of composition by the composition editing unit 311 or at the time of actual practice of image forming processing by the Job control unit 312.

<Power Condition Transition of Image Processing Controller and Image Forming Apparatus>

Figure 6:
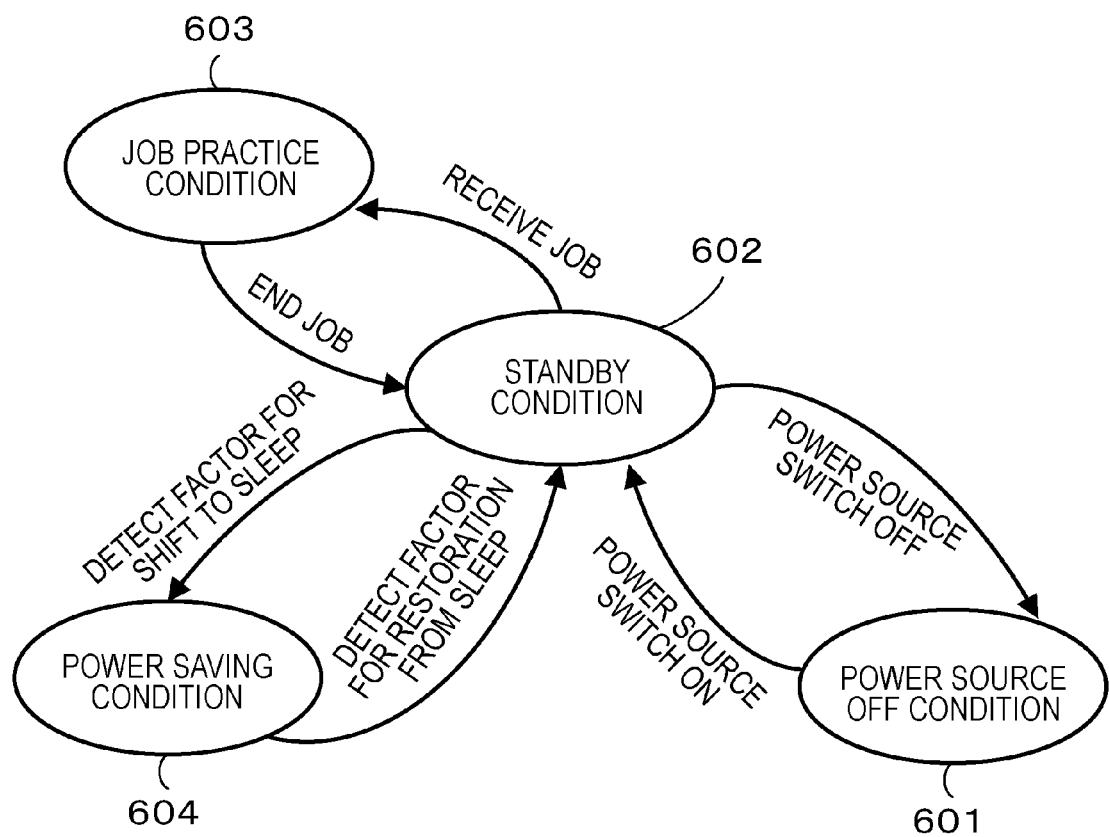
FIG. 6 illustrates an example of transition of the power condition of the image processing controller and the image forming apparatus.

FIG. 6 illustrates a transition of the power conditions of the image processing controller 102 and the image forming apparatus 103.

The power condition of each of the image processing controller 102 and the image forming apparatus 103 according to this embodiment lies in any one of a power source OFF condition 601, a standby condition (first power condition) 602, a job practice condition 603, and the power saving condition (second power condition) 604. While the four conditions are assumed in this embodiment, the power conditions according to the invention are not limited to these conditions. Each of the image processing controller 102 and the image forming apparatus 103 may lie in other power conditions.

For example, the image processing controller 102 may be in a suspension condition or a hibernation condition. The suspension condition is a condition where the image processing controller 102 can be restored to the standby condition 602 at a high speed. In the suspension condition, the memory 202 is kept turned on, wherefore the image processing controller 102 starts and shifts to the standby condition 602 from the condition stored in the memory 202 as the condition of the image processing controller 102.

Similarly, the hibernation condition is a condition where the image processing controller 102 can be restored to the standby condition at a high speed. In the hibernation condition, the power condition is similar to the power source OFF condition 601, and power supply to the respective parts of the image processing controller 102 stops. However, the different point from the power source OFF condition 601 is that the condition of the image processing controller 102 is stored in the HDD 203 before shift to the hibernation condition. Restoration of the image processing controller 102 from the hibernation condition to the standby condition is carried out at a high speed based on the information stored in the HDD 203.

The order of the high power consumption of the power condition of each of the image processing controller 102 and the image forming apparatus 103 is: Job practice condition 603>standby condition 602>power saving condition 604>power source OFF condition 601.

The respective power conditions of the image forming apparatus 103 are now described.

The power source OFF condition 601 is a condition where the rocker switch 253 of the image forming apparatus 103 is turned off. In this condition, power supply to all the components of the image forming apparatus 103 stops. When the user turns on the rocker switch 253 in the power source OFF condition 601, the image forming apparatus 103 shifts to the standby condition 602.

The standby condition 602 is a condition where the image forming apparatus 103 is waiting for execution of a job. In this condition, power is supplied to all the components of the image forming apparatus 103. However, power is not required to be supplied to all the components of the image forming apparatus 103. In other words, only power supply to the essential components is needed, and power supply to other components (such as operation unit 105) may be stopped. When receiving a job from the client computer 101 via the image processing controller 102, the image forming apparatus 103 in the standby condition 602 shifts to the job practice condition 603. When a factor for shift to power saving is produced in the standby condition 602, the image forming apparatus 103 shifts to the power saving condition 604.

Examples of the factor for shift to power saving include the following examples (1) through (3).

(1) The user presses a button (not illustrated) for shift to power saving.

(2) A predetermined period of time elapses without execution of a printing job, a scan job or others in the standby condition 602.

(3) A predetermined period of time elapses without access to a remote UI of the image forming apparatus 103 from the client computer 101.

When the user turns off the rocker switch 253 in the standby condition 602, the image forming apparatus 103 is shut down and shifts to the power source OFF condition 601. Shut down in this context is a process for ending the OS and the applications so as to end the image forming apparatus 103.

The job practice condition 603 is a condition where the image forming apparatus 103 is practicing a job. In this condition, power is supplied to all the components of the image forming apparatus 103. However, power is not required to be supplied to all the components of the image forming apparatus 103 in the job practice condition 603. In other words, only power supply to the essential components is needed, and power supply to other components (such as operation unit 105) may be stopped. In addition, power supply to units not used for practicing the corresponding job may be stopped. More specifically, at the time of practicing a printing job for forming an image on a sheet, power supply to the operation unit 105, the scanner unit 104, and others not used for practicing the printing job may be stopped. After the end of the job in the job practice condition 603, the image forming apparatus 103 shifts to the standby condition 602.

The power saving condition 604 is a condition where the image forming apparatus 103 is waiting in the state of power saving. In this condition, power is supplied to a part (containing the network I/F 210) of the components of the MFP controller 106 in the structure of the image forming apparatus 103. Under the power saving condition 604, power supply to the scanner unit 104, the printer unit 107, the operation unit 105 and others stops. When receiving a factor for restoration from power saving in the power saving condition 604, the image forming apparatus 103 shifts to the standby condition 602. In addition, the network I/F 210 can respond to a simple packet transmitted via the network while remaining in the power saving condition 604. This function is referred to as a proxy response. Examples of the simple packet include ARP request, SNMP condition acquisition, ICMP neighbor discovery, and other packets. ARP represents Address Resolution Protocol. SNMP represents Simple Network Management Protocol. ICMP represents Internet Control Message Protocol.

Examples of the factor for restoration from power saving include the following examples (1) and (2):

(1) The user presses a button (not illustrated) for restoration from power saving.

(2) The image forming apparatus 103 receives a job from the client computer 101.

The respective power conditions of the image processing controller 102 are now described.

The power source OFF condition 601 is a condition where the OS of the image processing controller 102 is shut down. When the user turns on a not-illustrated power source switch in the power source OFF condition 601, the image processing controller 102 shifts to the standby condition 602.

The standby condition 602 is a condition where the image forming apparatus 103 is waiting for execution of a job. In the standby condition 602, power is supplied to all the components of the image processing controller 102. When receiving a printing job from the client computer 101 in the standby condition 602, the image processing controller 102 shifts to the job practice condition 603. When a factor for shift to power saving is produced in the standby condition 602, the image processing controller 102 shifts to the power saving condition 604.

Examples of the factor for shift to power saving include the following examples (1) through (3):

(1) The user instructs shift to the power saving condition.

(2) A predetermined period of time elapses without execution of a printing job, a scan job or others in the standby condition 602.

(3) A predetermined period of time elapses without access to a job management tool of the image processing controller 102 from the client computer 101.

The job practice condition 603 is a condition where the image processing controller 102 is practicing a job. In this condition, power is supplied to all the components of the image processing controller 102. After the end of the job in the job practice condition 603, the image processing controller 102 shifts to the standby condition 602.

The power saving condition 604 is a condition where the image processing controller 102 is waiting in the state of power saving. In this condition, power is supplied to the network I/Fs 204 and 205 in the structure of the image processing controller 102. When receiving a factor for restoration from power saving in the power saving condition 604, the image processing controller 102 shifts to the standby condition 602.

Examples of the factor for restoration from power saving include the following examples (1) and (2).

(1) The user presses the power source button of the image processing controller 102.

(2) The image processing controller 102 receives a magic packet.

The magic packet in this context refers to a network packet specially coded for turning on a power source of a device by way of a network.

<Description of Operation Performed by Image Forming Apparatus When Image Forming Apparatus Transmits Device Status Information to Outside>

Figure 7:
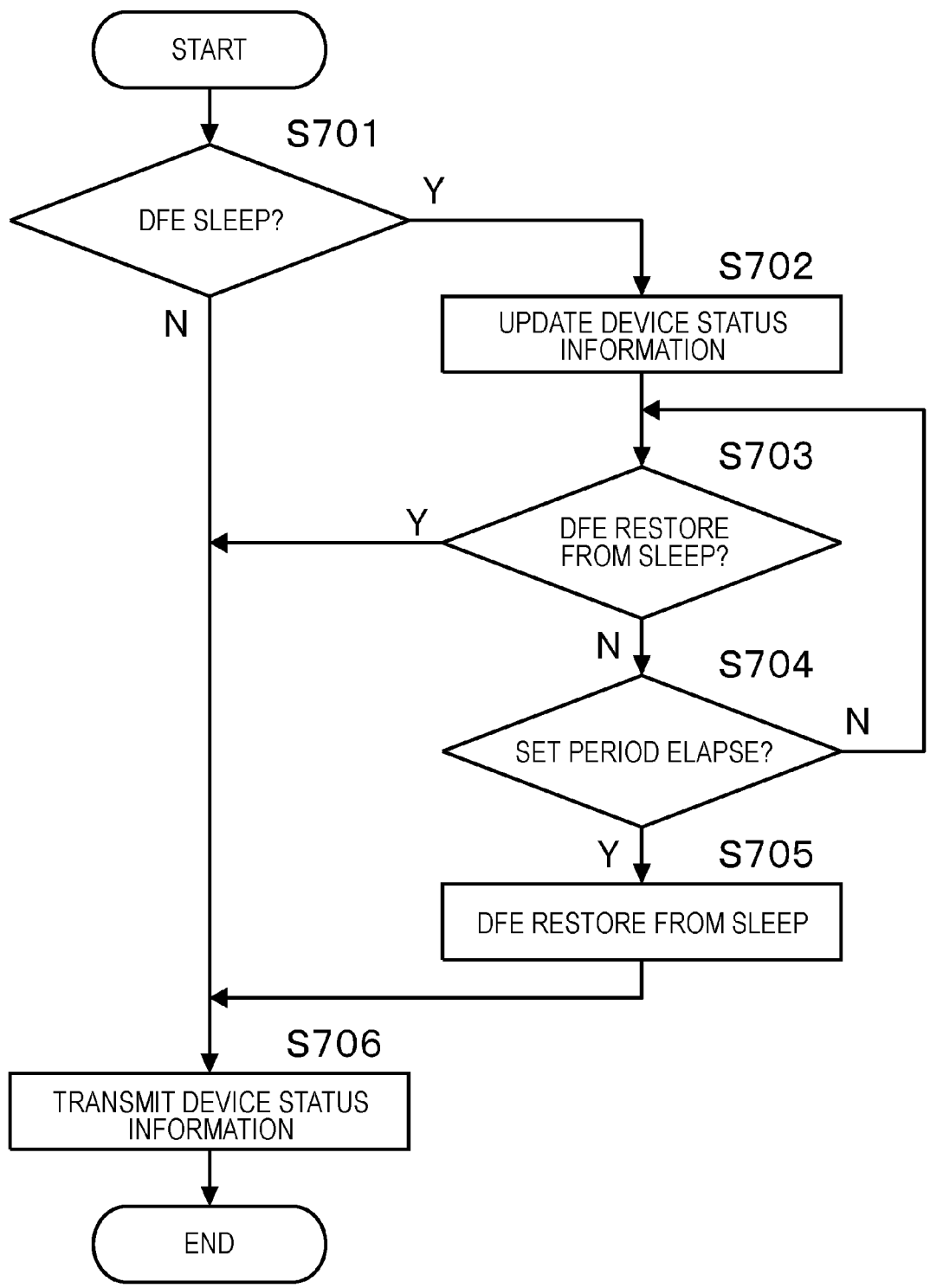
FIG. 7 is a flowchart illustrating an example of a device status information transmitting operation performed by the image forming apparatus.

Described hereinafter with reference to a flowchart in FIG. 7 is the operation of the image forming apparatus 103 performed when the image forming apparatus 103 transmits device status information to the external server 114 in the power saving condition of the image processing controller 102.

FIG. 7 is a flowchart illustrating an operation example of the image forming apparatus 103 performed when the image forming apparatus 103 transmits the device status information to the external server 114.

The flowchart illustrated in FIG. 7 is carried out under a program deployed in the memory 209 and implemented by the CPU 208. In this flowchart, the image processing controller 102 is expressed as DFE (Digital Front End). In addition, the power saving condition 604 is expressed as SLEEP.

The image forming apparatus 103 regularly transmits the device status information to the external server 114. Examples of the device status information include counter information, jam information, toner information, and error information. When the image forming apparatus 103 transmits the device status information to the external server 114, the CPU 208 determines whether the image processing controller 102 is in the power saving condition 604 or not (S701).

When determining that the image processing controller 102 is not in the power saving condition 604 (No in step S701), the CPU 208 allows the network I/F 210 to transmit the device status information to the external server 114 (S706).

On the other hand, when determining that the image processing controller 102 is in the power saving condition (Yes in step S701), the CPU 208 saves and over-writes the device status information in a determined area of the HDD 211 (S702). As a result, the latest device status information is stored in this area.

Then, the CPU 208 determines whether the image processing controller 102 has been restored from the power saving condition or not (S703). When determining that the image processing controller 102 has been restored from the power saving condition (Yes in step S703), the CPU 208 allows the network I/F 210 to transmit the device status information updated in step S602 to the external server 114 (S706).

On the other hand, when determining that the image processing controller 102 has not been restored from the power saving condition (No in step S703), the CPU 208 shifts the flow to step S704. In step S704, the CPU 208 determines whether the elapsed time from the previous transmission of the device status information to the external server 114 exceeds a maximum transmission time interval (stored in HDD 211, for example). When determining that the elapsed time does not exceed the maximum transmission time interval (NO in step S704), the CPU 208 repeats the determinations in steps S703 and S704.

On the other hand, when determining that the elapsed time exceeds the maximum transmission time interval (Yes in step S704), the CPU 208 shifts the flow to step S705. In step S705, the CPU 208 transmits a magic packet to the image processing controller 102 via the network I/F 210 and the control cable 111 to restore the image processing controller 102 from the power saving condition (S705). Then, the CPU 208 allows the network I/F 210 to transmit the device status information updated in step S702 to the external server 114 (S706).

Figure 12:
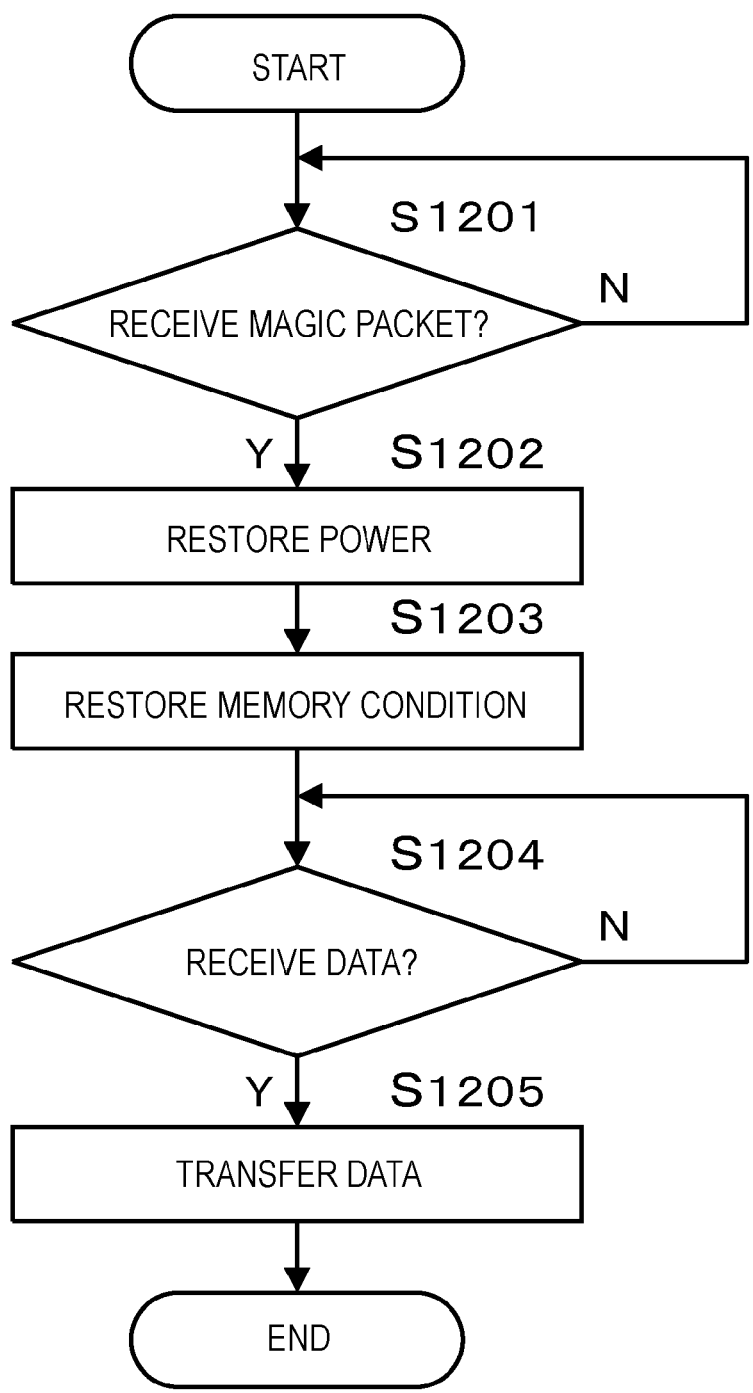
FIG. 12 is a flowchart illustrating an example of operation performed by the image processing controller in a power saving condition.

Described herein with reference to a flowchart illustrated in FIG. 12 is the operation of the image processing controller 102 performed when the image forming apparatus 103 transmits the device status information to the external server 114 in the power saving condition of the image processing controller 102.

FIG. 12 is a flowchart illustrating an operation example of the image processing controller 102 in the power saving condition.

Under the power saving condition of the image processing controller 102, the CPU 401 on the network I/F 205 of the image processing controller 102 monitors whether a magic packet addressed to the CPU 401 has been transmitted or not (S1201). When determining that a magic packet addressed to the CPU 401 has not been received (No in step S1201), the CPU 401 repeats determination in step S1201.

On the other hand, when determining that a magic packet addressed to the CPU 401 has been received (Yes in step S1201), the CPU 401 supplies power to the CPU 201 to restore the image processing controller 102 from the power saving condition (S1202). The magic packet received by the image processing controller 102 in this step corresponds to the magic packet transmitted from the image forming apparatus 103 in step S705 in FIG. 7.

The CPU 201 restored by power supply obtains the memory data immediately before transition to the power saving condition 604 from the HDD 203, loads the obtained data into the memory 202, and restores the image processing controller 102 from the power saving condition 604 to the standby condition 602 (S1203).

Then, the CPU 201 determines whether the network I/F 205 has received the data or not (S1204). When determining that the network I/F 205 has not received the data (No in step S1204), the CPU 201 repeats the determination in step S1204.

On the other hand, when determining that the network I/F 205 has received the data (Yes in step S1204), the CPU 201 shifts the flow to step S1205. The data received in this step corresponds to the device status information transmitted from the image forming apparatus 103 in step S706 in FIG. 7.

In step S1205, the CPU 201 transfers the received data (device status information) to the LAN 113 via the network I/F 204 to transmit the device status information to the external server 114.

According to the first embodiment, on the occasion of transmission of the device status information to the external server 114, the image forming apparatus 103 only updates the device status information and does not transmit the device status information to the external server 114 (regulates (reserves) transmission) when the image processing controller 102 is in the power saving condition. When the image processing controller 102 is restored from the power saving condition, the image forming apparatus 103 transmits the device status information to the external server 114. This structure offers the advantages of reduction of the number of times of restoration of the image processing controller 102 from the power saving condition, and resultant reduction of power consumption. When a predetermined time elapses with transmission of the device status information kept regulated (reserved), the image processing controller 102 is restored from the power saving condition, and allowed to transmit the device status information subjected to transmission regulation (reservation).

<Description of Operation of Image Forming Apparatus Performed when Image Forming Apparatus Receives E-Mail>

Figure 8:
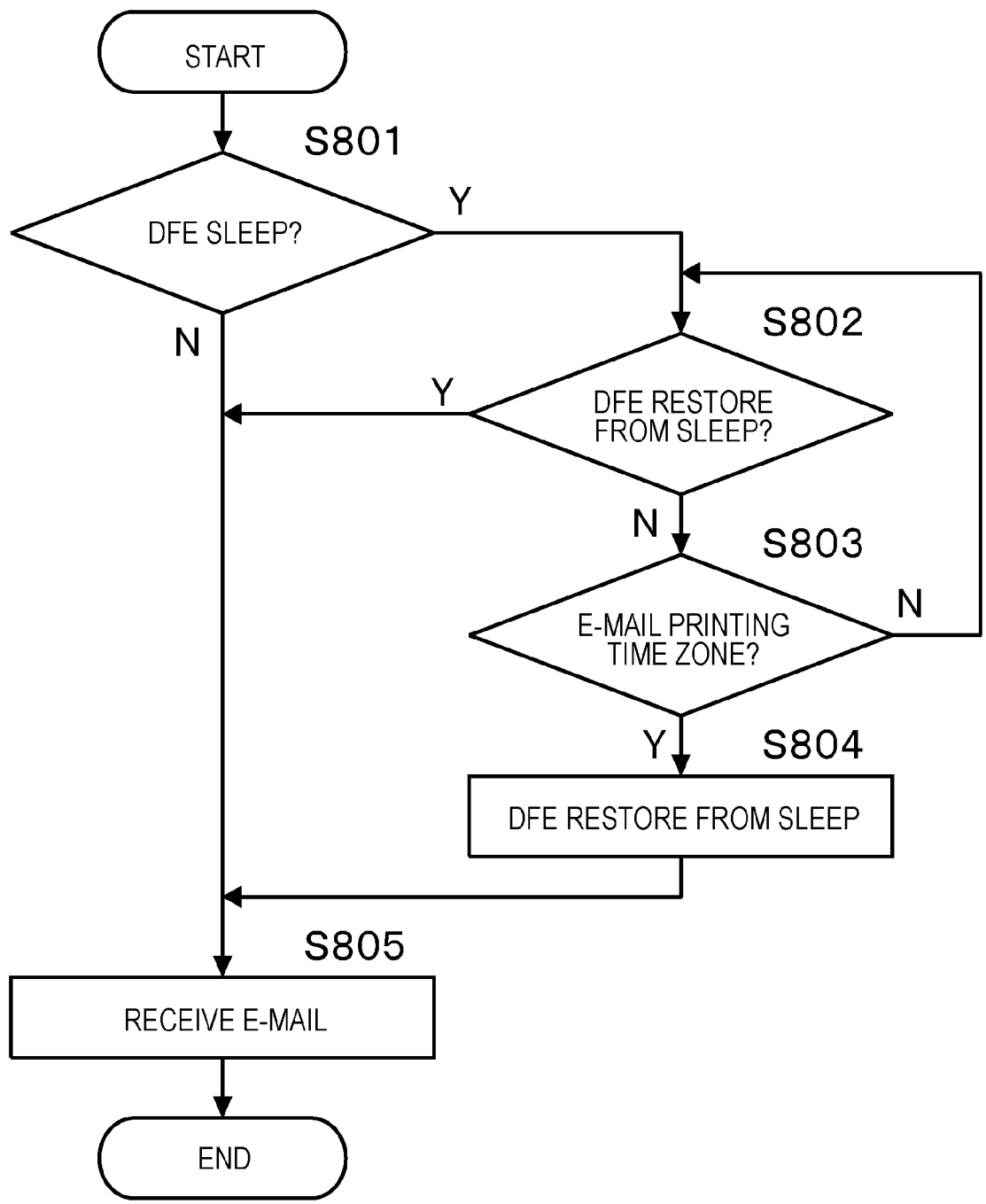
FIG. 8 is a flowchart illustrating an example of an e-mail receiving operation performed by the image forming apparatus.

Described hereinafter with reference to a flowchart in FIG. 8 is the operation of the image forming apparatus 103 performed when the image forming apparatus 103 receives an e-mail in the power saving condition of the image processing controller 102.

FIG. 8 is a flowchart illustrating the operation of the image forming apparatus 103 performed when the image forming apparatus 103 receives an e-mail. The flowchart illustrated in FIG. 8 is carried out under a program deployed in the memory 209 and implemented by the CPU 208. In this flowchart, the image processing controller 102 is expressed as DFE (Digital Front End).

The image forming apparatus 103 has an e-mail receiving function. The image forming apparatus 103 regularly accesses a not-illustrated external e-mail server (POP server) (i.e., transmits an e-mail reception command), and receives an e-mail. The image forming apparatus 103 automatically performs printing when receiving an e-mail. This e-mail printing function receives setting of an e-mail printing time zone. For example, when the e-mail printing time zone is set from 9 a.m. to 5 p.m., an e-mail received at a time out of the time zone from 9 a.m. to 5 p.m. is only received and not printed at that time.

When the image forming apparatus 103 receives an e-mail, the CPU 208 determines whether the image processing controller 102 is in the power saving condition 604 or not (S801). When determining that the image processing controller 102 is not in the power saving condition 604 (No in step S801), the CPU 208 accesses the POP server (transmits an e-mail reception command thereto) and receives an e-mail (S805).

On the other hand, when determining that the image processing controller 102 is in the power saving condition 604 (Yes in step S801), the CPU 208 shifts the flow to step S802.

In step S802, the CPU 208 determines whether the image processing controller 102 has been restored from the power saving condition 604. When determining that the image processing controller 102 has been restored from the power saving condition (Yes in step S802), the CPU 208 accesses the POP server (transmits an e-mail reception command thereto), and receives an e-mail (S805).

On the other hand, when determining that the image processing controller 102 has not been restored from the power saving condition (No in step S802), the CPU 208 determines whether the current time falls within the e-mail printing time zone (S803). When determining that the current time does not lie in the e-mail printing time zone (No in step S803), the CPU 208 repeats the determinations in steps S802 and S803.

On the other hand, when determining that the current time falls within the e-mail printing time zone (Yes in step S803), the CPU 208 shifts the flow to step S804. In step S804, the CPU 208 transmits a magic packet to the image processing controller 102 via the network I/F 210 and the control cable 111 to restore the image processing controller 102 from the power saving condition. Then, the CPU 208 accesses the POP server (transmits an e-mail reception command thereto) and receives an e-mail (S805).

The operation of the image processing controller 102 performed when the image forming apparatus 103 receives an e-mail in the power saving condition of the image processing controller 102 is similar to the corresponding operation described in the first embodiment with reference to FIG. 12. However, the image processing controller 102 receives an e-mail reception command (S1204) after restoration from the power saving condition (S1202, S1203), and transfers the received e-mail reception command to the LAN 113 (S1205).

According to the second embodiment, on the occasion of reception of an e-mail by the image forming apparatus 103, the image forming apparatus 103 does not receive the e-mail (regulates (reserves) transmission of e-mail reception command to e-mail server) when the image processing controller 102 is in the power saving condition. When the image processing controller 102 is restored from the power saving condition, or when the current time falls within the e-mail printing time zone, the image forming apparatus 103 receives the e-mail. This structure offers the advantages of reduction of the number of times of restoration of the image processing controller 102 from the power saving condition for reception of an e-mail in the period out of the e-mail printing time zone, and resultant reduction of power consumption.

According to this embodiment, the image processing controller 102 is allowed to be restored from the power saving condition and receive an e-mail when the current time falls within the printing time zone. However, in addition to this structure, the image processing controller 102 may be also allowed to be restored from the power saving condition and receive an e-mail when the counted number of times of continuous failure of access to the POP server exceeds a predetermined number (such as ten times). The predetermined number of times of continuous failure of access to the POP server in this context corresponds to a predetermined number of times of continuous regulation (reservation) of e-mail reception command transmission by the CPU 208.

Similarly to the first embodiment, the image processing controller 102 in the second embodiment may be configured to be restored from the power saving condition and transmit an e-mail reception command after an elapse of the maximum transmission time interval from the time of the previous transmission of the e-mail reception command.

Similarly to the second embodiment, the image processing controller 102 in the first embodiment may be configured to be restored from the power saving condition and transmit the device status information when the current time falls within a predetermined time zone set beforehand.

<Description of Operation of Image Forming Apparatus Performed When Image Forming Apparatus Transmits Scan Data>

Figure 9:
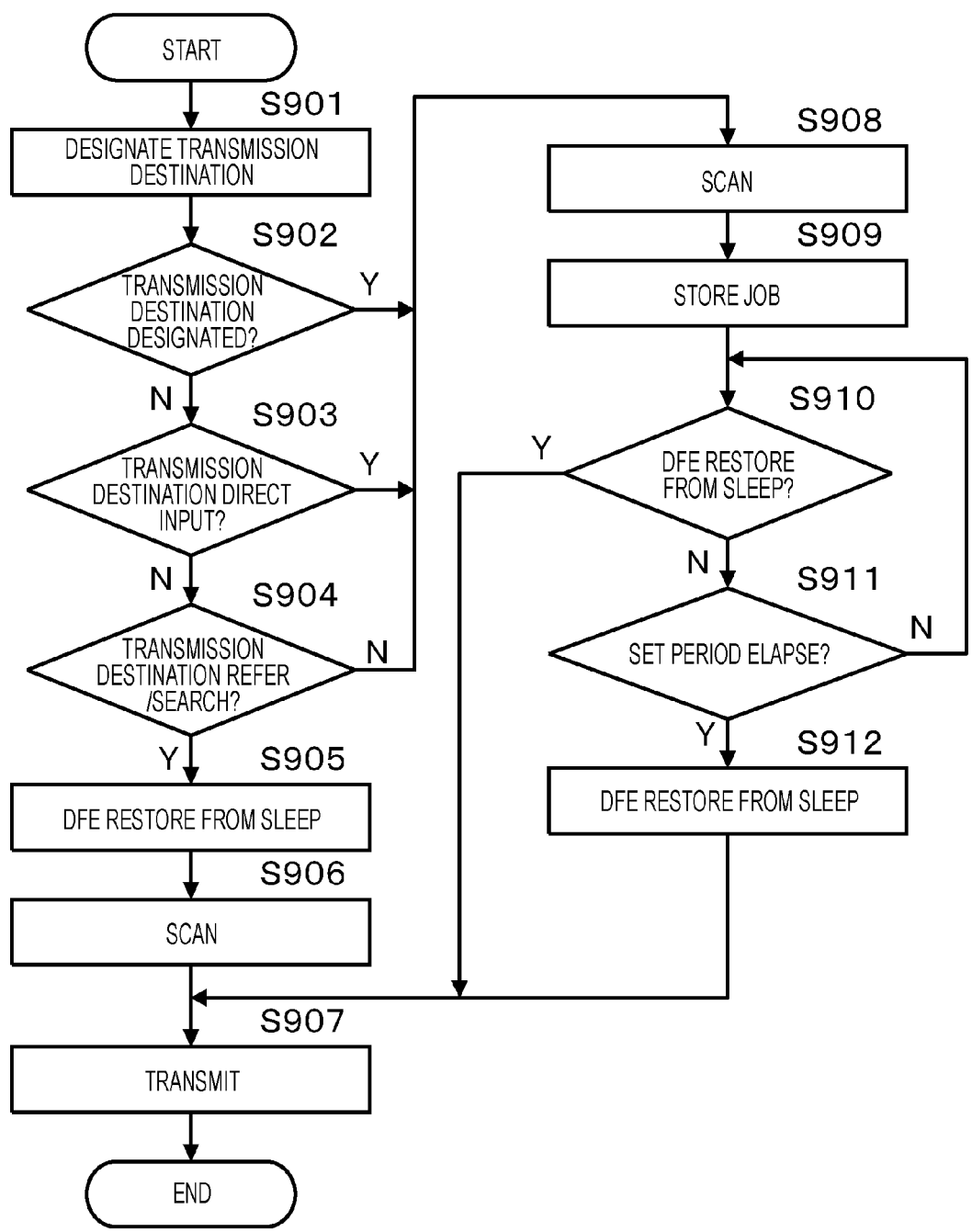
FIG. 9 is a flowchart illustrating an example of an external transmission job operation performed by the image forming apparatus.

Described hereinafter with reference to a flowchart in FIG. 9 is the operation of the image forming apparatus 103 performed when the image forming apparatus 103 transmits scan data in the power saving condition of the image processing controller 102.

FIG. 9 is a flowchart illustrating an operation example of the image forming apparatus 103 performed when the image forming apparatus 103 transmits scan data. The flowchart illustrated in FIG. 9 is executed under a program deployed in the memory 209 and implemented by the CPU 208. In this flowchart, the image processing controller 102 is expressed as DFE (Digital Front End).

The image forming apparatus 103 has the SEND function which transmits scan data to the external client PC 101 and server 114. Examples of the designation method of the transmission destination include designation using a mail address contained in an address book where the user registers transmission destinations beforehand, designation by direct input of a mail address, designation by a registered file server, designation by a file server connected with a network and searched thereon.

According to the image forming apparatus 103, the setting of the SEND operation performed in the power saving condition of the image processing controller 102 can be determined beforehand.

Figure 10:
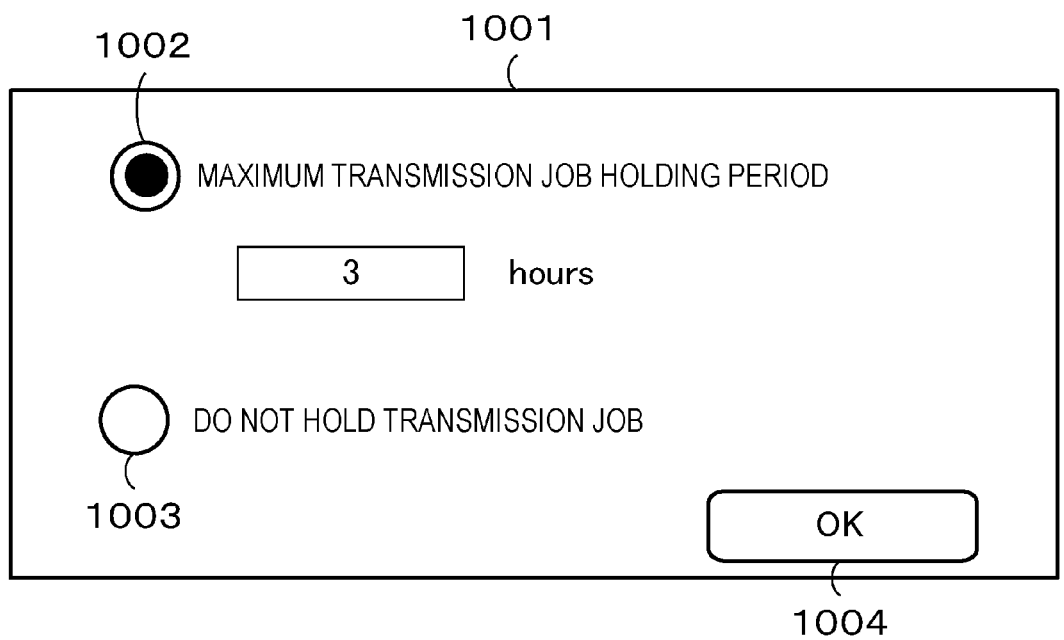
FIG. 10 illustrates an example of a maximum transmission job holding period setting window of the image forming apparatus.

FIG. 10 illustrates an example of a maximum transmission job holding period setting window for determining the setting of the SEND operation performed in the power saving condition of the image processing controller 102.

A setting window 1001 is displayed on the operation unit 105 to allow an administrator of the image forming system 100 to determine the setting of the SEND operation using the setting window 1001.

A button 1002 is a button for selecting an option that the maximum transmission job holding period is set. The maximum transmission job holding period in this context refers to the maximum holding period from the scan time of scan data to the transmission time of the data. When the button 1002 is selected, a desired maximum transmission job holding period is allowed to be inputted to a blank 1005. According to the example illustrated in FIG. 10, the maximum transmission holding period is set to 3 hours.

A button 1003 is a button for selecting an option that the maximum transmission job holding period is not set. The button 1003 is selected when immediate transmission of scan data is desired for every transmission. When an OK button 1004 is pressed, the CPU 208 stores the result of the setting in the HDD 211 of the MFP controller 106, for example.

At the start of the SEND function by the image forming apparatus 103 under the power saving condition of the image processing controller 102, the CPU 208 changes the display of the operation unit 105 to a scan data transmission destination setting window (not illustrated) and receives the designation of the transmission destination from the user (S901).

When the designation of the transmission destination is inputted from the user, the CPU 208 determines the transmission destination inputted by the user (S902, S903, S904).

When determining that the transmission destination inputted by the user corresponds to the client PC 101 or the server 114 located on the network and referred to and searched for by the operation unit 105 (No in step S902, No in step S903, and Yes in step S904), the CPU 208 shifts the flow to step S905.

In step S905, the CPU 208 transmits a magic packet to the image processing controller 102 via the network I/F 210 and the control cable 111 to restore the image processing controller 102 from the power saving condition. Then, the CPU 208 actuates the scanner unit 104 and generates scan image data (S906). The CPU 208 transmits the scan image data to the designated transmission destination (S907).

When determining that the transmission destination inputted by the user corresponds to a mail address set in an address book or others beforehand, or a registered file server (Yes in step S902), the CPU 208 shifts the flow to step S908. When determining that the transmission destination inputted by the user corresponds to a mail address or a file server directly inputted (Yes in step S903), the CPU 208 shifts the flow to step S908.

In step S908, the CPU 208 actuates he scanner unit 104 and generates scan image data. The CPU 208 further stores the scan image data generated in step S908 in a transmission job holding area of the HDD 211 (S909).

Then, the CPU 208 determines whether the image processing controller 102 has been restored from the power saving condition (S910). When determining that the image processing controller 102 has been restored from the power saving condition (Yes in step S910), the CPU 208 transmits the scan image data to the designated transmission destination (S907).

On the other hand, when determining that the image processing controller 102 has not been restored from the power saving condition (No in step S910), the CPU 208 shifts the flow to step S911. In step S911, the CPU 208 determines whether the elapsed time from execution of scan in step S908 exceeds the maximum transmission job holding period set beforehand. When determining that the elapsed time from execution of scan does not exceed the maximum transmission job holding time (No in step S911), the CPU 208 repeats the determinations in steps S910 and S911.

On the other hand, when determining that the elapsed time from execution of scan exceeds the maximum transmission job holding time (Yes in step S911), the CPU shifts the flow to step S912. In step S912, the CPU 208 transmits a magic packet to the image processing controller 102 via the network I/F 210 and the control cable 111 to restore the image processing controller 102 from the power saving condition. Then, the CPU 208 transmits the scan image data to the designated transmission destination (S907).

Figure 11:
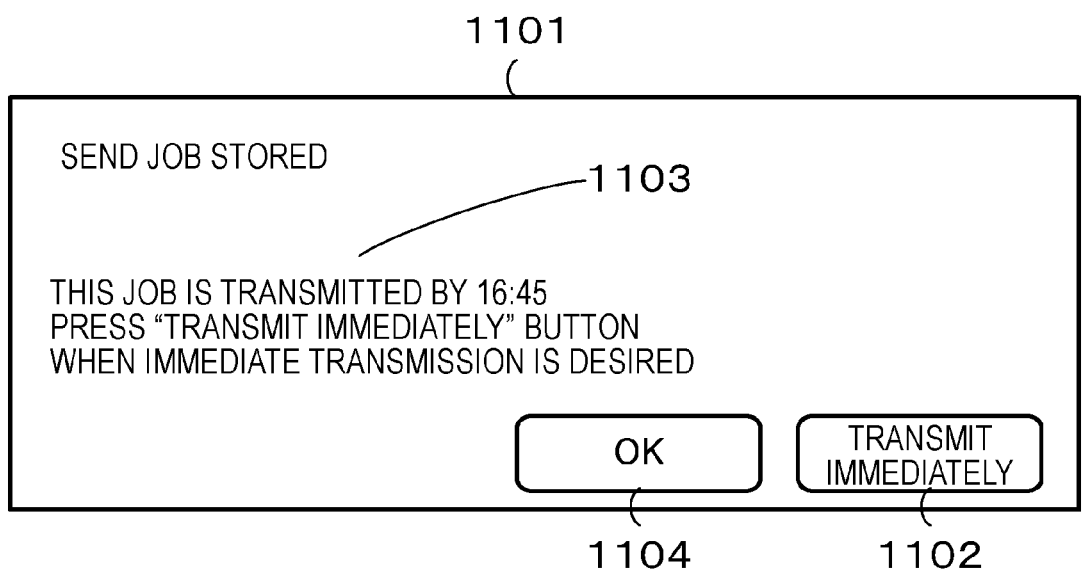
FIG. 11 illustrates an example of a SEND job transmission confirmation window of the image forming apparatus.

In the job storing process in step S909, a transmission confirmation window 1101 may be displayed on the operation unit 105 as illustrated in FIG. 11.

FIG. 11 illustrates an example of the transmission confirmation window 1101 for determining the setting of the SEND operation performed in the power saving condition of the image processing controller 102.

After storing the scan data in the HDD 211, the CPU 208 allows the SEND job transmission confirmation window 1101 to be displayed on the operation unit 105. This display of the transmission confirmation window 1101 contains within the message a time 1103 after an elapse of the maximum transmission job holding period (set by the button 1002 in FIG. 10) from the time of scan. In other words, the time displayed as the time 1103 corresponds to the time when the scan data held without transmission is to be transmitted at the latest.

Accordingly, the message containing the time 1103 notifies the user about the time when the scan data is to be transmitted at the latest. Moreover, this time is printed as the scheduled transmission time under the control of the CPU 208 on the occasion of status printing performed when obtaining information about the job from the operation unit 105 of the image forming apparatus 103.

When immediate transmission of scan data is desired, the user presses a "transmit immediately" button 1102. When the "transmit immediately" button 1102 is pressed, the CPU 208 transmits a magic packet to the image processing controller 102 via the network I/F 210 and the control cable 111 to restore the image processing controller 102 from the power saving condition. Then, the CPU 208 transmits the scan image data to the designated transmission destination. On the other hand, when an OK button 1104 is pressed, the CPU 208 holds the scan image data without transmission, and allows the data to be transmitted only at the time corresponding to the time 1103.

When storage of the scan job in the scan job storage area of the HDD 211 is not allowed due to an insufficient capacity or for other reasons at the time of storage of the scan job in step S909, the scan data may be transmitted immediately. In this case, the CPU 208 immediately transmits a magic packet to the image processing controller 102 via the network I/F 210 and the control cable 111 to restore the image processing controller 102 from the power saving condition. Then, the CPU 208 transmits the scan image data to the designated transmission destination.

The operation of the image processing controller 102 performed when the image forming apparatus 103 transmits scan data in the power saving condition of the image processing controller 102 is similar to the corresponding operation in the first embodiment. However, the image processing controller 102 receives scan data (S1204) after restoration from the power saving condition (S1202, S1203), and transfers the received scan data to the LAN 113 (S1205).

According to the third embodiment, on the occasion of transmission of scan data from the image forming apparatus 103, the image forming apparatus 103 does not transmit the scan data immediately but holds the scan data (regulates (reserves) transmission) in the HDD 211 of the image forming apparatus 103 when the image processing controller 102 is in the power saving condition. After the image processing controller 102 is restored from the power saving condition, or after the period set beforehand elapses from the time of scan, the CPU 208 transmits the scan data. This structure offers advantages of reduction of the number of times of restoration of the image processing controller 102 from the power saving condition for scan data transmission, and resultant reduction of power consumption.

Similarly to the second embodiment, the image processing controller 102 in the third embodiment may be configured to be restored from the power saving condition and transmit scan data when the current time falls within a predetermined time zone.

As described above, the image processing controller 102 can be maintained in the power saving condition for the longest possible time when immediate data transmission is not needed from the image forming apparatus 103 to the outside. This advantage contributes to energy saving by reduction of the number of times of restoration of the image processing controller 102 from the power saving condition, which controller 102 functions as a relay for data transmission from the image forming apparatus 103.

The respective data structures and contents discussed herein have been presented by way of example only. Obviously, these structures and contents may be constituted by other various types of structures and contents in accordance with the purpose of use and the object.

While particular embodiments have been described herein, the present invention may be practiced in various forms including a system, a device, a method, a program, a memory medium and so forth. More specifically, the invention is applicable to a system constituted by a plurality of devices, or may be an apparatus constituted by a single device.

In addition, structures constituted by combinations of the respective embodiments are all included in the scope of the invention.

The invention may be practiced by the following processes. Software (program) under which the functions of the respective embodiments described herein are performed is supplied to a system or an apparatus via a network or using various types of memory media. The program is read and implemented by a computer (or a CPU, an MPU or the like) of the system or the apparatus.

The invention is applicable to a system constituted by a plurality of devices, or an apparatus constituted by a single device.

The invention is not limited to the embodiments described herein. Various modifications (including organic combinations of the embodiments) may be made to the respective embodiments, and these modifications and changes should not be excluded from the scope of the invention. In other words, structures constituted by combinations of the respective embodiments and modified examples thereof are all included in the scope of the invention.

According to the present invention, energy saving is achieved by reduction of the number of times of restoration of an image processing controller from a power saving condition, which controller functions as a relay for data transmission from an image forming apparatus.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-184255, filed Sep. 5, 2013, which is hereby incorporated by reference herein in its entirety.

What is claimed is:

1. An image forming apparatus capable of receiving a raster image from an image processing controller which generates the raster image, the image forming apparatus comprising:

memory; and a processor, the processor configured to:

transmit device information of the image forming apparatus to an external device via the image processing controller;

determine whether the image processing controller is in a first power condition or in a second power condition which consumes lower power than the first power condition; and allow transmission of the device information to the external device via the image processing controller, in a case where it is determined that the image processing controller is in the first power condition, and restrict transmission of the device information to the external device via the image processing controller until the image processing controller returns to the first power condition from the second power condition, in a case where it is determined that the image processing controller is in the second power condition.

2. The image forming apparatus according to claim 1, wherein in a case where it is determined that the image processing controller is in the second power condition, the image processing controller is restored to the first power condition and the device information is transmitted to the external device, when the image processing controller is still in the second power condition after an elapse of a predetermined period.

3. The image forming apparatus according to claim 2, further comprising a display unit configured to display a window for setting the predetermined period.

4. The image forming apparatus according to claim 2, wherein a particular packet is transmitted to the image processing controller so as to restore the image processing controller to the first power condition.

5. The image forming apparatus according to claim 1, wherein the device information is data regularly transmitted by the image forming apparatus.

6. The image forming apparatus according to claim 1, wherein the device information is at least one of counter information, jam information, toner information, and error information.

7. The image forming apparatus according to claim 1, further comprising:

a receiving unit configured to receive instructions for allowing the transmission of the device information, wherein the transmission of the device information to the external device is allowed after the image processing controller is restored to the first power condition on the occasion of reception of the instructions by the receiving unit.

8. A control method for an image forming apparatus capable of receiving a raster image from an image processing controller which generates the raster image, the method comprising:

transmitting device information of the image forming apparatus to an external device via the image processing controller, determining whether the image processing controller is in a first power condition or in a second power condition which consumes lower power than the first power condition;

in a case where it is determined that the image processing controller is in the first power condition, allowing transmission of the device information of the image forming apparatus to an external device via the image processing controller; and in a case where it is determined that the image processing controller is in the second power condition, restricting transmission of the device information to the external device via the image processing controller until the image processing controller returns to the first power condition.

9. A non-transitory computer recordable medium storing computer-executable instructions for controlling an image forming apparatus capable of receiving a raster image from an image processing controller which generates the raster image, the instructions, when executed by a computer, performing functions comprising:

transmitting device information of the image forming apparatus to an external device via the image processing controller;

determining whether the image processing controller is in a first power condition or in a second power condition which consumes lower power than the first power condition; and allowing transmission of the device information to the external device via the image processing controller in a case where it is determined that the image processing controller is in the first power conditioner;

restricting transmission of the device information to the external device via the image processing controller until the image processing controller returns to the first power condition from the second power condition in a case where it is determined that the image processing controller is in the second power condition.

* * * * *